UNITED STATES PATENT OFFICE.

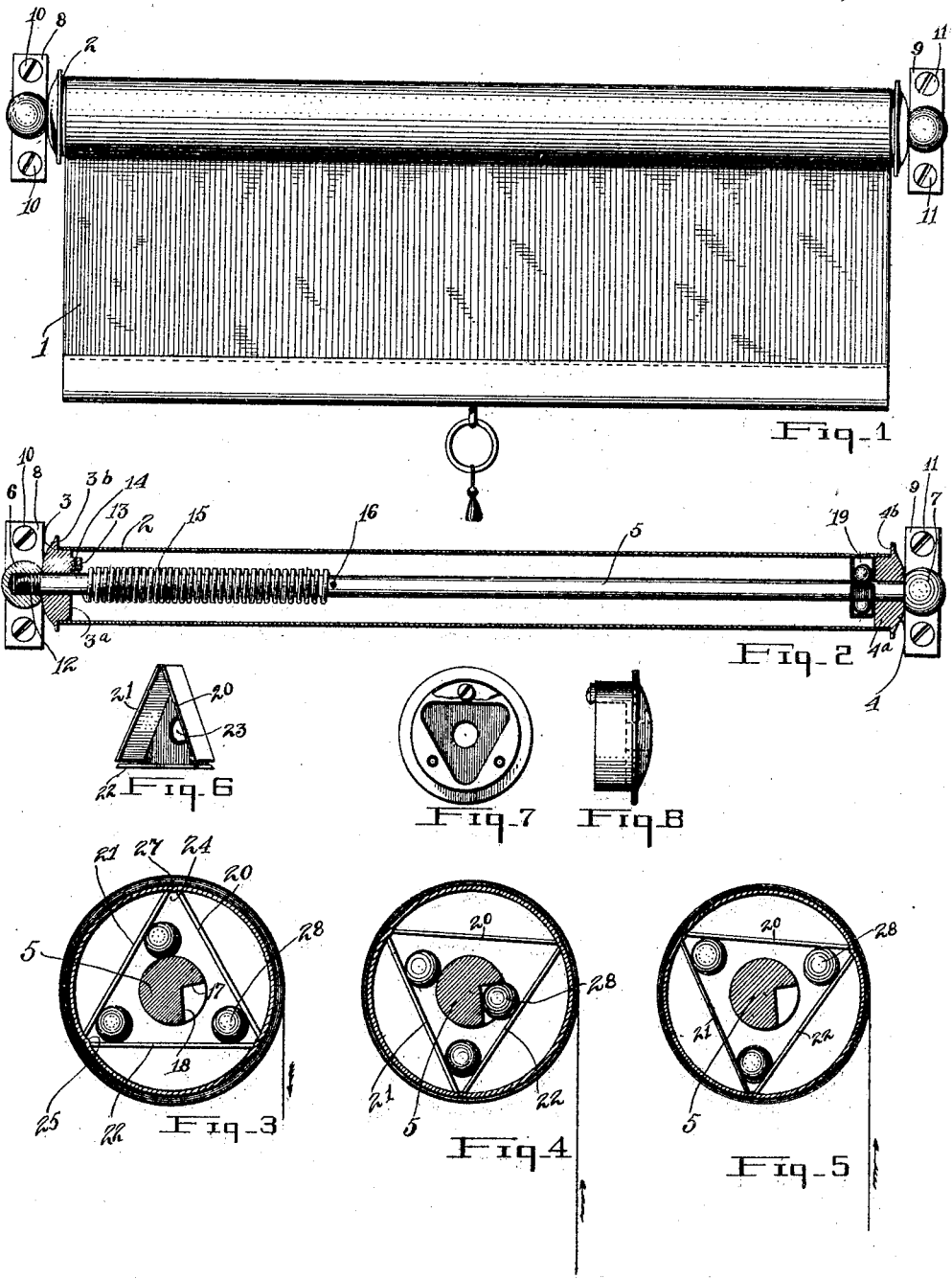

FRED A. REARDON, OF BRIDGEPORT, CONNECTICUT.

CURTAIN-FIXTURE.

1,395,297.  Specification of Letters Patent.  Patented Nov. 1, 1921.

Application filed March 8, 1920. Serial No. 364,189.

*To all whom it may concern:*

Be it known that I, FRED A. REARDON, a citizen of the United States, residing at Bridgeport, in the county of Fairfield and State of Connecticut, have invented certain new and useful improvements in Curtain-Fixtures, of which the following is a specification, reference being had therein to the accompanying drawings.

This invention relates to curtain fixtures of the spring roller type and while intended more particularly as a support for automobile curtains may obviously be used to advantage whenever spring curtain rollers are commonly employed.

Such rollers as are usually found on the market are frequently uncertain in action especially when used in vehicles, wherein the vibrations and frequent shocks so affect the retaining clutch elements of the rollers as to render it almost impossible to adjust or keep the curtain in desired position.

Furthermore, under the common practice of placing the clutch elements in exposed position and of making these parts of relatively small size their action is often interfered with very seriously by the accumulation of dust and grit thereon.

One object of the present invention is to provide a spring tension roller of relatively simple construction having all its operative parts wholly inclosed so that they are unaffected by dust and dirt.

Another object of the invention is to provide a spring roller having a retaining clutch therefor whose operative elements are substantially unaffected in their action by sudden shocks or continued vibrations.

A further object of the invention is to construct a curtain roller clutch employing balls or equivalent devices, such for example as rolls as clutch elements and having a very simple and cheaply constructed ball retainer which may be quickly and readily applied to the roller.

Other objects and advantages of the present invention, together with various changes and modifications therein will be described at length in the specification and particularly pointed out in the claims, reference being had to the annexed drawings as illustrating a preferred embodiment thereof and in which,—

Figure 1 is an elevation showing the fixture in position with a curtain supported thereon;

Fig. 2 is a vertical section through the axis of the roller of Fig. 1, the curtain being absent;

Figs. 3, 4 and 5 are diagrammatic cross sectional views of the clutch device illustrating its mode of operation;

Fig. 6 is a perspective view of the ball retainer illustrating the manner of forming the same, and Figs. 7 and 8 are front end views, respectively, of a modified form of ball retainer.

The numeral 1 indicates a curtain or shade of usual material and designs carried upon the roller 2. As clearly shown in Fig. 2 this roller is of tubular construction and is formed of sheet metal or other suitable material, it being within the scope of the invention, however, to make the roller solid with properly arranged cavities therein for the reception of the various operative elements carried thereby.

The roller 2 has fixed within its opposite ends the caps 3 and 4, respectively, these caps being reduced in diameter at one side to provide the bosses $3^a$, $4^a$ which enter within the open ends of the roller and to which the latter is secured in any desired manner. This construction provides the flanges $3^b$, $4^b$ which assist in retaining the shade in proper position as it is wound on the roller.

The caps 3 and 4 are provided with central openings through which passes a rod 5, this rod extending axially of the roller 2 and projecting beyond the outer face of each cap. 6 and 7 are a pair of bracket members having feet 8 and 9, respectively, which may be secured by screws 10, 11 or in other suitable manner to the frame of the window to which the curtain fixture is to be applied.

The bracket members 6 and 7 are provided with sockets for the reception of the ends of the rod 5 and the latter may be fixedly secured in one or both of said sockets in any suitable manner. In the present disclosure the socket in bracket 6 is screw-threaded for engagement by screw threads 12 on the end of the rod, but it is to be understood that any equivalent means for securing the rod against rotation relative to the brackets may be substituted therefor without departing from the present invention.

As herein shown the cap 3 has a lug 13 projecting inside the roller, this lug having an opening 14 therein into which is hooked one end of a coiled spring 15 encircling the rod 5 and having its opposite end fixedly secured to the rod as by passing its extremity through an opening 16 in the rod. At a point adjacent the inner surface of the cap 7 the rod 5 is slotted in such a manner as to provide an abutment comprising a surface 17 constituting a shoulder, which, when the rod 5 is properly positioned, extends in a substantially horizontal position and which is located eccentrically of the shaft. The abutment also comprises a surface 18 extending from the inner end of, and substantially perpendicularly to the face of the shoulder 17.

19 is a box-like receptacle forming a ball retainer, this retainer being fixedly secured interiorly of the roller 2 and surrounding the slotted portion of rod 5.

The retainer 19 is preferably formed from sheet material by bending up the edges of a properly formed blank to form the sides 20, 21 and 22, the retainer being herein shown as of equi-lateral triangular shape and having an opening 23 centrally of its bottom for the passage of rod 5. The corners of the retainer are not fully closed but are left open sufficiently to provide slots or openings such as 24, 25. In mounting the retainer in position in the roller it is slipped into the open end thereof, bottom first, until it reaches the desired point and then the material of the roller is struck inwardly as shown at 27 into engagement with the openings 24, 25 whereby the retainer is securely fixed relatively to the roller. Other and equivalent means for securing the retainer in position may be substituted for that above described, such as rivets passing through the roller and into engagement with the openings 24, 25, or if desired the corners of the retainer may be fully closed and solder applied for securing them to the interior surface of the roller.

Within one or more of the corners of the retainer is located a freely movable body herein shown as a bearing ball 28 of usual type, this ball being of a diameter such that it is unable to pass the rod so as to move from one to another corner of the retaining receptacle. Rollers may, however, be substituted for the balls if desired. While as herein shown, it is desirable to provide each corner of the retainer with a ball, this is not essential to a satisfactory operation of the device, nor is it to be understood that the invention is limited to the employment of a triangular receptacle as others of suitable shape may be employed.

As the retainer is located adjacent the cap 4 the inner surface of the latter forms a cover for the retainer, thus preventing escape of the balls.

In the modification shown in Figs. 7 and 8, the ball retainer is shown as formed integral with the cap, the inner end of which is designed to have secured thereto in any desired manner an annular ring or equivalent device forming a closure for the retainer 19ᵃ to prevent the escape of the balls therefrom.

The operation of the fixture forming the subject matter of this application is as follows, attention being directed to Figs. 3, 4 and 5 as illustrative thereof.

As seen in Fig. 3 the curtain is being pulled down and as the retainer turns about the axis of rod 5, the balls 28 roll freely around upon the outside circular portion of the rod and as they approach the slot fall into the lower corner of the retainer, thus freely passing the surfaces 17, 18. As the curtain is lowered, the spring 15 is placed under tension thus tending, upon release of the curtain, to reverse the direction of rotation of the roller, thereby to wind the curtain thereon. When the curtain has been properly adjusted, it is permitted to rise slightly, whereupon the ball carried in the lower right-hand corner (Fig. 3) of the retainer rolls along the side of the retainer until stopped by surface 18. A further slight movement brings the ball into engagement with shoulder 17 between which and the adjacent side of the retainer it is wedged (see Fig. 4), thus preventing further rotation of the roller to wind the curtain thereon. In the position seen in Fig. 4 the curtain roller is securely locked in adjusted position and no ordinary vibration or shock will serve to disengage the parts.

When it is desired to release the clutch the curtain is quickly pulled down and then released. At the quick downward movement of the curtain, the rapid revolution of the roller serves to throw all the balls outwardly by centrifugal action into the corners of the retainer and as the curtain is quickly released the inertia of the balls causes them to remain in said corners (see Fig. 5) until rotation in the opposite direction generates sufficient centrifugal force to hold them there during the winding of the curtain. When the desired position has been reached the curtain is brought nearly to rest permitting one of the balls to roll inwardly into contact with the abutment formed by shoulder 17 and surface 18, thus locking the roll in its new position.

As will be seen from inspection of the drawings all the operative parts of the device as above described are entirely inclosed within the body of the roller and are concealed from view, while at the same time they are fully protected from dust and dirt, thus insuring freedom of operation at all times.

Moreover, the parts forming the clutch means are of substantial size and construction thus eliminating to a large extent the danger of breakage or displacement when subjected to the sudden shocks attendant upon use.

By the employment of sheet metal in the roller and clutch device the cost of construction is kept down, while at the same time a very desirable fixture is obtained which is particularly suited to sustain abusive treatment such as that to which automobile curtains are frequently subjected.

The clutch employed is furthermore of a type especially adapted to automobile use where the constant jar and vibration renders the ordinary ratchet clutch very unreliable. In the clutch herein disclosed the only effect of vibration, if any, is to cause the clutch elements to interlock more firmly, such elements being free to unlock upon the exertion of any substantial downward pull upon the curtain. Furthermore, by properly proportioning the several parts the balls may all be substantially confined against undesired movement when the roller is stationary. Moreover, the tendency of that one of the balls or rolls which serves as a lock at any time is to take up any looseness between the retainer and the shaft, thus forcing the other balls or rolls more closely into their respective corners of the retainer. This makes the device particularly desirable for automobile use where loose parts are usually objectionable on account of their tendency to rattle.

Having thus described the invention, together with a preferred embodiment thereof and the mode of operation of the same, together with some of the advantages to be secured from its use, what I claim and desire to secure by Letters Patent of the United States is:—

1. A curtain fixture of the class described having, in combination, a spring tensioned roller and clutch means for normally preventing rotation of the same, said clutch means comprising a retainer fixed to said roller and having a substantially triangular chamber therein, a body freely movable in said chamber, and a fixed abutment member extending within said chamber in position for engagement by said body.

2. A curtain fixture having, in combination, a spring tensioned roller and a clutch for retaining the same against rotation, said clutch comprising a hollow substantially triangular retainer fixed to said roller, three balls disposed within said retainer and a stationary abutment extending into said retainer and disposed eccentrically thereof.

3. A curtain fixture having, in combination, a spring tensioned roller and a clutch therefor, said clutch comprising a sheet metal box of triangular form, a freely movable body within said box, means for preventing escape of said body from the box, and a fixed eccentric abutment extending within said box.

4. A curtain fixture comprising, in combination, a roller having an axial cavity therein, a hollow sheet metal retainer member of regular polygonal form secured within said cavity, a ball within said retainer and an abutment member extending within said retainer member for engagement by said ball.

5. A curtain fixture comprising a tubular roller, a substantially triangular sheet metal retainer seated within said roller and having its corners secured to said roller, a plurality of balls within said retainer, and a relatively fixed abutment located within said retainer for engagement by said balls.

6. A curtain fixture having, in combination, a spring tensioned roller and clutch means for normally retaining said roller in desired position, said clutch means comprising a substantially triangular box-like retainer secured at its corners within a suitable cavity in said roller.

7. In a curtain fixture, in combination, a roller having a cavity therein and clutch means for retaining said roller in adjusted position, said means comprising an angular box-like retainer seated within said cavity and fixedly secured thereto by striking the material of the roller inwardly into intimate contact with the corner portions of said retainer, and coöperating clutch elements within said retainer.

8. In combination, a tubular curtain roller, means for rotatably supporting the same, and clutch means for normally retaining the roller in desired position, said means comprising a sheet metal box or retainer of polygonal shape and having openings at its corners, said box or retainer being seated within said roller, and secured in position by striking the material of said roller into engagement with said openings, cover means for said box, and coöperative clutch elements within said box.

9. A curtain fixture having in combination a rotatable roller, a shaft for supporting the same, means tending to turn said roller in one direction, and a clutch for normally preventing rotation of the same, said clutch comprising a retainer fixed to said roller and having an equilateral triangular cavity therein concentric with the shaft, said shaft extending centrally through said cavity, and balls seated in the respective compartments of said cavity defined by adjacent walls thereof and the shaft, respectively.

In testimony whereof I have signed my name to this specification.

FRED A. REARDON.